(12) United States Patent
Childs

(10) Patent No.: US 7,677,496 B2
(45) Date of Patent: Mar. 16, 2010

(54) STRINGER FOR AN AIRCRAFT WING AND A METHOD OF REINFORCING THEREOF

(75) Inventor: Thomas Childs, Bristol (GB)

(73) Assignee: Airbus Operations Limited, Bristol (GB)

( * ) Notice: Subject to any disclaimer, the term of this patent is extended or adjusted under 35 U.S.C. 154(b) by 114 days.

(21) Appl. No.: 11/858,991

(22) Filed: Sep. 21, 2007

(65) Prior Publication Data

US 2008/0105786 A1 May 8, 2008

(30) Foreign Application Priority Data

Nov. 3, 2006 (GB) ................. 0621952.1

(51) Int. Cl.
*B64C 1/00* (2006.01)
(52) U.S. Cl. ............... 244/123.1; 244/117 R; 244/123.7; 244/123.8; 52/831; 52/838; 52/836; 52/846
(58) Field of Classification Search ............ 244/117 R, 244/123.1, 123.7, 123.8
See application file for complete search history.

(56) References Cited

U.S. PATENT DOCUMENTS

| | | | | |
|---|---|---|---|---|
| 2,390,761 | A | | 12/1945 | Watter |
| 2,395,205 | A | * | 2/1946 | Watter ................. 52/506.06 |
| 3,995,081 | A | * | 11/1976 | Fant et al. .................. 428/119 |
| 5,842,317 | A | * | 12/1998 | Pettit ............................ 52/514 |
| 5,860,194 | A | * | 1/1999 | Takizawa et al. ............. 24/452 |
| 5,893,534 | A | * | 4/1999 | Watanabe ................... 244/119 |
| 6,393,796 | B1 | * | 5/2002 | Goettl et al. .................. 52/846 |
| 6,543,721 | B2 | * | 4/2003 | Palm ..................... 244/117 R |
| 6,561,459 | B2 | * | 5/2003 | Amaoka et al. ......... 244/123.7 |
| 6,595,467 | B2 | * | 7/2003 | Schmidt .................... 244/119 |
| 7,074,474 | B2 | * | 7/2006 | Toi et al. .................... 428/102 |
| 7,080,805 | B2 | * | 7/2006 | Prichard et al. ........ 244/117 R |
| 2003/0226935 | A1 | * | 12/2003 | Garratt et al. .............. 244/123 |
| 2005/0077427 | A1 | * | 4/2005 | Brenner et al. ......... 244/117 R |

FOREIGN PATENT DOCUMENTS

| | | |
|---|---|---|
| EP | 1166950 A2 | 1/2002 |
| GB | 206998 | 11/1928 |
| GB | 565235 | 11/1944 |
| GB | 573976 | 12/1945 |
| GB | 2109711 | 6/1983 |

OTHER PUBLICATIONS

GB Search Report dated Feb. 28, 2007 for GB0621952.1.
GB Search Report dated Aug. 3, 2007 for GB0621952.1.

* cited by examiner

*Primary Examiner*—Michael R Mansen
*Assistant Examiner*—Justin Benedik
(74) *Attorney, Agent, or Firm*—Lowe Hauptman Ham & Berner LLP

(57) ABSTRACT

The present invention relates to a stringer for an aircraft wing and a method of reinforcing such a stringer in which the stringer is formed with a substantially lambda shaped section.

12 Claims, 3 Drawing Sheets

US 7,677,496 B2

STRINGER FOR AN AIRCRAFT WING AND A METHOD OF REINFORCING THEREOF

RELATED APPLICATIONS

The present application is based on, and claims priority from, British Application Number 0621952.1 filed Nov. 3, 2006, the disclosure of which is hereby incorporated by reference herein in its entirety.

FIELD OF INVENTION

The present invention relates to a stringer for an aircraft wing and a method of reinforcing such a stringer.

BACKGROUND OF THE INVENTION

The core of an aircraft wing is a section called a wing box. The wing box is faired into the aircraft fuselage and runs from the root towards the tip of the wing. The wing box provides the central sections of the upper and lower aerofoil surfaces for the wing in addition to attachment points for engines and control surfaces such as ailerons, trim flaps and airbrakes. The aerofoil surfaces of the wing box are provided by panels referred to as wing covers. The wing covers include a number of structural elements called stringers, which run within the wing box structure from the root towards the tip. The stringers are arranged to provide the necessary structural stability and integrity to enable the wing covers to cope with the operational loads on the wing. Stringers also provide important attachment points for other parts of the wing box structure. For example, wing ribs are commonly braced to the stringers by rib cleats fastened between these two structures.

When building aircraft structures, one of many considerations is the balance between weight and strength. In other words, structures need to be as light as possible while providing the necessary strength and structural integrity to perform properly under operational loads. Some types of stringers such as box section stringers or hat section stringers are designed with closed cross-sections. Other types of stringers have open or semi-open cross sections such as J or Y section stringers respectively. These open or semi-open section designs are generally simpler to maintain and repair than closed section designs. The weight efficiency of any stringer shape depends on a balance of the thicknesses and widths of its section shape as well as section shape. Generally, Y and hat section designs are more efficient than I or J section designs. In other words, closed or semi-open section designs are generally more efficient than open section designs.

Repairing both closed, open or semi-open section stringers presents problems. Repairs are carried out when damage from cracking or corrosion is identified in part of a stringer. A repair generally involves fastening one or more plates in the form of doubler plates over the affected area. Closed or semi-open section stringers, such as hat section stringers or Y section stringers, can only be repaired using a relatively large number of blind fasteners, that is a fastener with one end within the closed section. Blind fastenings are difficult to fully inspect for serviceability. Repairing some stringers, such as Y section stringers, requires a complex set of doubler plates designed to conform the surface being repaired. J or I section stringers require less complex doubler plates but are generally less weight efficient than Y and hat section stringers as noted above.

SUMMARY OF THE INVENTION

An embodiment of the invention provides a stringer for an aircraft wing, the stringer comprising:

a first and second flanges each with an inner edge facing the other inner edge, the flanges being spaced apart in an attachment plane for attachment to a wing cover panel;

a first planar panel having a first edge integral with the first flange and an opposite second edge, the first planar panel extending away from the first flange in a plane substantially perpendicular to the attachment plane; and a second planar panel having a first edge integral with the inner edge of the second flange and an opposite second edge, the second planar panel member extending away from the second flange in a plane convergent with the plane of the first planar panel, the second edge of the second planar panel being integral with the first panel.

A free flange may extend from the second edge of the first planar panel. The first planar panel may provide one or more attachment points for one or more rib cleats. The second planar panel may join the first planar panel approximately midway between the first and second edges of the first planar panel. The flanges and the planar panels may be integrally formed. The stringer may be formed by extrusion. The stringer may be formed from a metal or a metal alloy.

A doubler plate may be provided for attachment to the stringer, the stringer being attached via the first and second flanges to a wing cover panel and the doubler plate being arranged to substantially conform to the or each forward orientated exposed face of the stringer and to the exposed face of the first or second flange. A doubler plate may be provided for attachment to the stringer, the stringer being attached to a wing cover panel via the first and second flanges and the doubler plate being arranged to substantially conform with the or each aft orientated exposed face of the stringer and to the exposed face of the first or second flange.

Another embodiment provides a method of reinforcing a stringer for an aircraft wing by fixing a doubler plate to the stringer, the stringer comprising:

a first and second flanges each with an inner edge facing the other inner edge, the flanges being spaced apart in an attachment plane for attachment to a wing cover panel;

a first planar panel having a first edge integral with the first flange and an opposite second edge, the first planar panel extending away from the first flange in a plane substantially perpendicular to the attachment plane;

a second planar panel having a first edge integral with the inner edge of the second flange and an opposite second edge, the second planar panel member extending away from the second flange in a plane convergent with the plane of the first planar panel, the second edge of the second planar panel being integral with the first panel; and the stringer being attached via the first and second flanges to a wing cover panel, and the doubler plate being arranged to substantially conform to the or each forward orientated exposed face of the stringer and to the exposed face of the first or second flange.

The doubler plate may be provided for attachment to the stringer, the stringer being attached to a wing cover panel via the first and second flanges and the doubler plate being arranged to substantially conform with the or each aft orientated exposed face of the stringer and to the exposed face of the first or second flange. One third or less of all the fasteners used to attach the doubler plates to the stringer may be blind fasteners.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
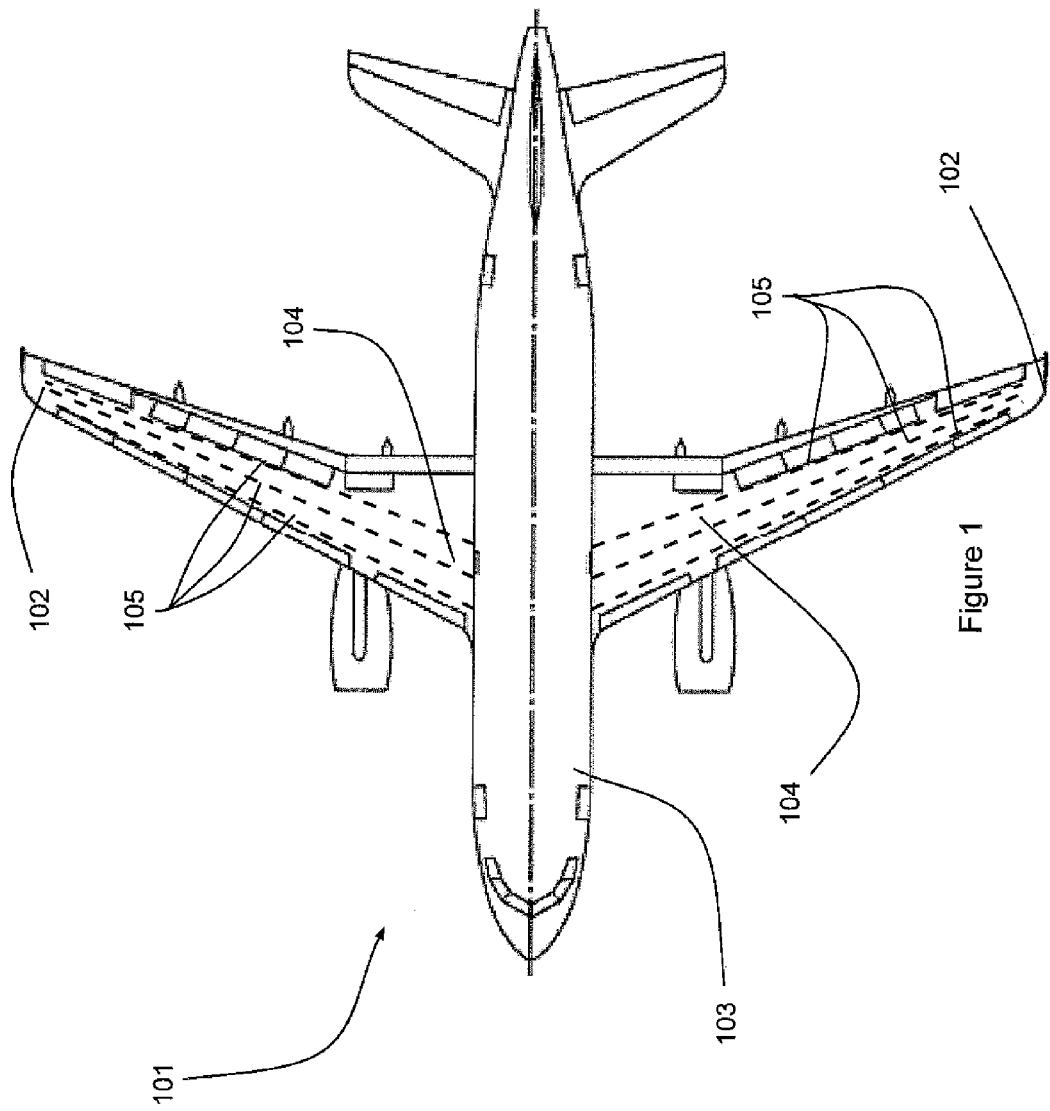
FIG. 1 is a plan view of an aircraft.

With reference to FIG. 1, an aircraft 101 comprises wings 102 attached to a fuselage 103. The wings 102 comprise a central structural element 104 in the form of a wing box. The wing box 104 runs from the root to the tip of each wing 102 and between the leading and trailing edges of the wing. The wing box 104 comprises a number of structural elements 105 in the form of stringers, which run from the root to the tip of each wing box 104.

Figure 2:
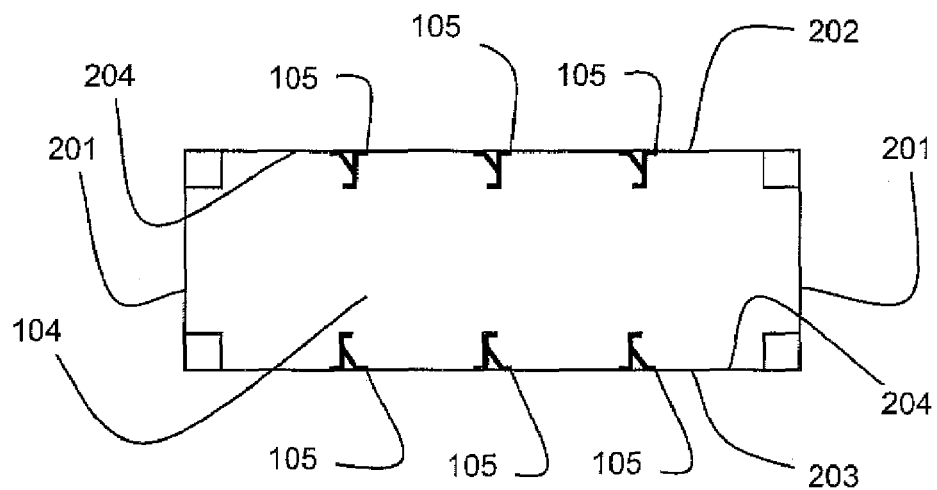
FIG. 2 is a cross-sectional view of a wing box of the aircraft of FIG. 1.

With reference to FIG. 2, the wing box 104 is constructed from two side members 201 in the form of spars, which provide attachment points for the leading and trailing edge structures (not shown) of the wing 102. The upper and lower surfaces 202, 203 of the wing box 104 provide the upper and lower aerofoil surfaces of the wing 102 and are each provided by wing cover panels 204. The stringers 105 are attached to the interior surface of the wing cover panels 204.

Figure 3:
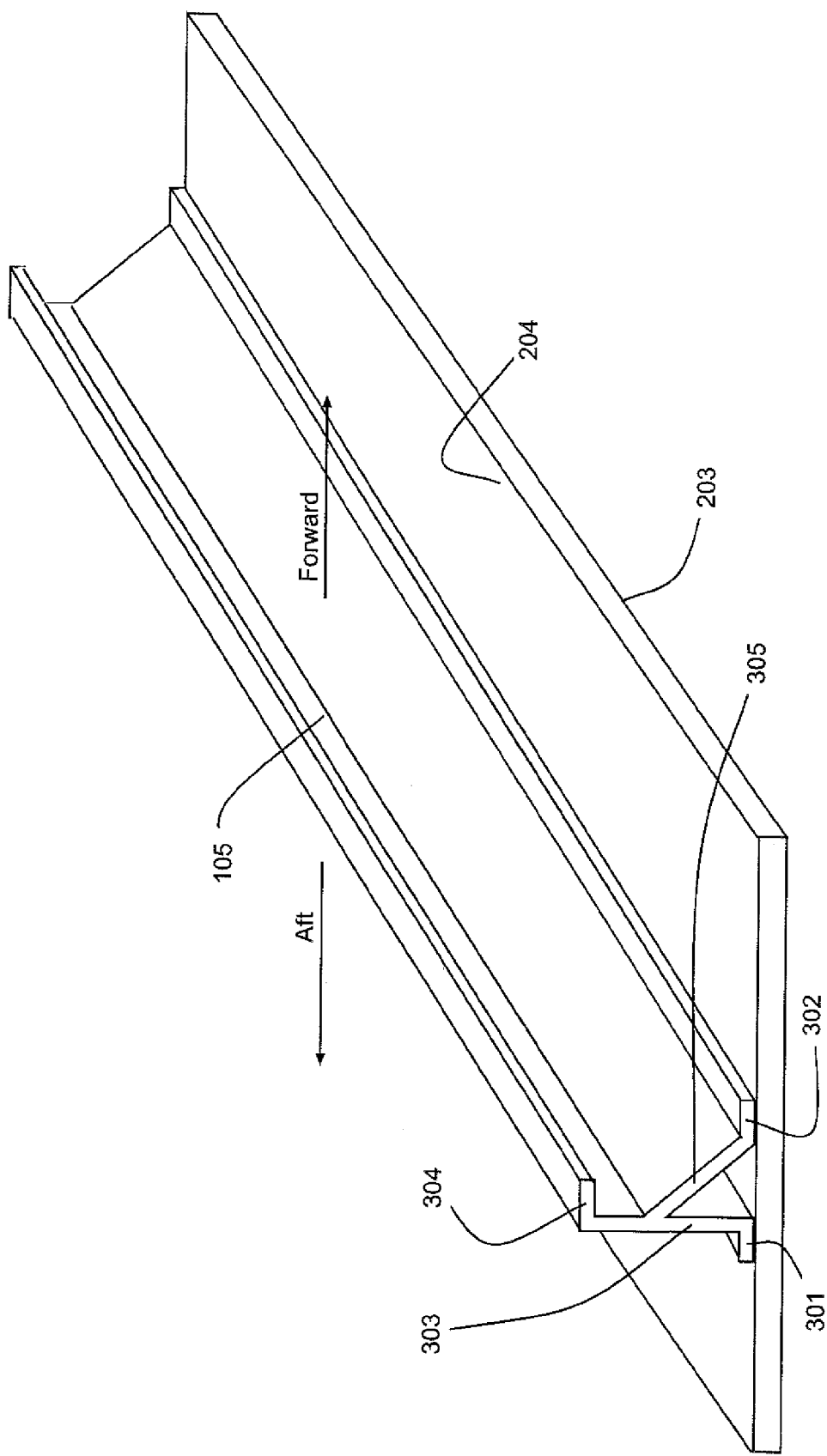
FIG. 3 is a perspective view of a stringer in the wing box of FIG. 2.

With reference to FIG. 3, the stringers 105 are formed by extrusion from a metal alloy in the form of aluminium alloy. The cross section of the stringer 105 is similar to the Greek letter lambda (λ). The stringer 105 comprises a first and second flanges 301, 302 each with an inner edge facing each other and spaced apart in their plane of attachment to the wing cover panel 204. A first planar panel, in the form of a first sidewall 303, has a first edge that is integral with the inner edge of the first flange 301. The first sidewall 303 extends away from the first flange 301 in a plane substantially perpendicular to the cover panel 204. The first sidewall 303 has a second edge opposite the first edge, which is integral with a free flange 304, which extends away from the first sidewall 303 in a plane generally parallel to the cover panel 204. A second planar panel, in the form of a second sidewall 305, has a first edge integral with the inner edge of the second flange 302 and extending away from the second flange in a plane convergent with plane of the first sidewall 303. The second sidewall 305 has a second edge, opposite the first edge, that is integral with the first sidewall 303. In the present embodiment, the second sidewall 305 joins the first sidewall 303 at the approximate midpoint of the first sidewall 303.

Stringers need to be reinforced once they become subject to certain levels of deterioration or damage. Reinforcement is performed by fixing doubler plates to the exposed faces of the stringer 105. In the present embodiment, two doubler plates are used. The first doubler plate is formed so as to conform to the forward facing exposed surfaces of the stringer 105. These forward facing surfaces, as shown in FIG. 3, comprise the upper surface of the second flange 302, the exposed or external surface of the second sidewall 305 and the forward facing exposed face of the first sidewall 303. The second doubler plate is formed so as to conform to the aft facing exposed surfaces of the stringer 105. These aft facing surfaces, as shown in FIG. 3, comprise the upper surface of the first flange 301, the external aft facing face of the first sidewall 303 and the upper surface of the free flange 304.

Figure 4:
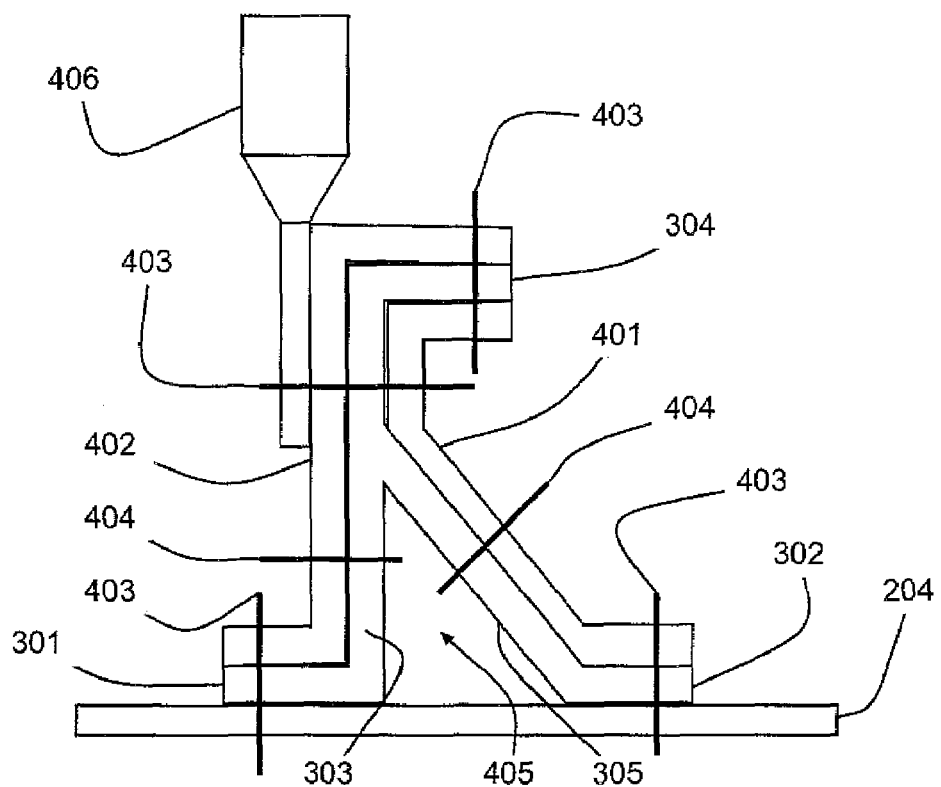
FIG. 4 shows a side view of a reinforced stringer in the wing box of FIG. 2.

With reference to FIG. 4, the first and second doubler plates 401, 402 are fastened to their respective faces of the stringer 105 using sets of six fasteners 403, 404 at each fastening point. FIG. 4 is a cross-section illustrating one such fastening points for the doubler plates 401 402. A number of such fastening points are distributed span-wise along the stringer 105, with the number of points being dependent on the span-wise extent of the doubler plates 403, 404. Once in place, the doubler plates 401, 402 sandwich the affected area of the stringer 105 to reinforce the stringer so as to compensate for the potential loss of integrity. One fastener 403 fastens the upper flanges of the first and second doubler plates 401, 402 through the free flange 304 and another fastener 403 fastens the doubler plates 401, 402 through the upper portion of the first sidewall 303 above its midpoint. Two further fasteners 403 fasten the lower flanges of the doubler plates 401, 402 through the second and first flanges 401, 402 respectively. All of the fasteners 403 are accessible for inspection from both of their ends, that is, they are non-blind fasteners. The remaining two fasters 404 fasten the first doubler plate 401 to the second sidewall 302 and the second doubler plate 402 to the lower portion of the first sidewall 303 below its midpoint. As a result of the positions of these fasteners 404, one end of each is within the closed internal space 405 of the stringer 105. Such fasteners 404 are referred to as blind fasteners.

With reference to FIG. 4, prior to fixing the doubler plates 401, 402 to the stringer 105, the upper portion of the first sidewall 303 served as an attachment point for a rib cleat 406 that provides bracing, within the wing box 104, between the stringer 105 and a wing rib (not shown). During the repair process, the rib cleat is temporarily detached from the stringer 105. After the fixing of the doubler plates 401, 402, the rib cleat 406 is refastened to the upper portion of the first sidewall 303 through doubler plates 401, 402 as shown in FIG. 4. The rib cleat fastener, both before and after the repair, is a non-blind fastener. The positions of the fasteners for the doubler plates 401, 402 are suitable spaced, span-wise, so as to be appropriately distanced from the fixing point for the rib cleat 406.

A lambda section stringer 105 described above is a type of semi-closed section stringer that presents a surface for rib cleat attachment without using blind fasteners. In addition, the stringer can be repaired using just two doubler plates with relatively simple forms. In other words, the second doubler plate 402 is formed with only two right angles while the first doubler plate is formed with only a single obtuse angle. Only two fasteners 404 out of the six fasteners 403, 404 needed are blind fasteners, that is, one third of all the fasteners 403, 404 are blind. Furthermore, the lambda section stringers described above can be provided with at least the same level of weight to strength efficiency of Y section or hat stringers.

In another embodiment, the lambda section is not upright, that is, the first sidewall is angled at less than 90° to the wing cover panel in the direction of the second flange. In a further embodiment, the lambda section is not provided with a free flange. In this case, the second doubler plate is further simplified, requiring only one right angle. In another embodiment, the second sidewall is joined to the first sidewall at a point above or below the midpoint of the first sidewall.

In a further embodiment, either the first doubler plate or the second doubler plate is used to reinforce the stringer. In this case, four fasteners are required to fasten the doubler plate to the stringer and only one of these fasteners is blind. In other words, only one quarter of all the fasteners used are blind.

In another embodiment, the stringer is bonded or welded to the wing cover panel and any doubler plates are either bonded, welded to fastened to the stringer. In a further embodiment, the stringer is integrally formed with its associated cover panel. In another embodiment, the stringer is built by fastening or bonding together a number of separately formed panels.

As will be understood by those skilled in the art, the relative configurations of the flanges, the or each sidewall and free flange may be varied to suit the particular application of a given stringer. The machining of the stringer blank may be carried out by any suitable process such as milling, etching, abrading, punching, routing or drilling. The stringers may be formed from any suitable material such as a metal, metal alloy or other suitable non-metallic material.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A stringer for an aircraft wing, said stringer comprising:
   a first and second flanges each with an inner edge facing said other inner edge, said flanges being spaced apart in an attachment plane for attachment to a wing cover panel;
   a first planar panel having a first edge integral with said first flange and an opposite second edge, said first planar panel extending away from said first flange in a plane substantially perpendicular to said first flange and attachment plane; and
   a second planar panel having a first edge integral with said inner edge of said second flange and an opposite second edge, said second planar panel member extending away from said second flange at an obtuse angle and in a plane convergent with said plane of said first planar panel, said second edge of said second planar panel being integral with said first panel at a position between said first and second edges of said first planar panel.

2. A stringer according to claim 1 further comprising a free flange extending from said second edge of said first planar panel in a plane substantially parallel to said first flange and said attachment flange.

3. A stringer according to claim 1 in which said first planar panel provides one or more attachment points for one or more rib cleats.

4. A stringer according to claim 1 in which said second planar panel joins said first planar panel approximately midway between said first and second edges of said first planar panel.

5. A stringer according to claim 1 in which said flanges and said planar panels are integrally formed.

6. A stringer according to claim 1 formed by extrusion.

7. A stringer according to claim 1 in which said stringer is formed from a metal or a metal alloy.

8. A stringer according to claim 1, said stringer being attached via said first and second flanges to a wing cover panel and comprising a doubler plate arranged to substantially conform to the or each forward oriented exposed face of said stringer and to the exposed face of said first or second flange.

9. A stringer according to claim 1, said stringer being attached to a wing cover panel via said first and second flanges and comprising a doubler plate arranged to substantially conform to the or each aft oriented exposed face of said stringer and to the exposed face of said first or second flange.

10. A stringer according to claim 8, further comprising three or more fasteners attaching said doubler plates to said stringer, wherein one third or less of said fasteners are blind fasteners.

11. A stringer according to claim 9, further comprising three or more fasteners attaching said doubler plates to said stringer, wherein one third or less of said fasteners are blind fasteners.

12. A stringer according to claim 1, wherein the stringer has an essentially lamda shape.

* * * * *